(12) United States Patent
Nagasaka

(10) Patent No.: US 6,714,290 B2
(45) Date of Patent: Mar. 30, 2004

(54) METHOD FOR MEASURING FAR-END REFLECTANCE OF FIBER-OPTIC CABLE

(75) Inventor: Koji Nagasaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 144 days.

(21) Appl. No.: 09/996,820

(22) Filed: Nov. 30, 2001

(65) Prior Publication Data

US 2002/0101578 A1 Aug. 1, 2002

(30) Foreign Application Priority Data

Dec. 1, 2000 (JP) ........................................ 2000-367780
Sep. 5, 2001 (JP) ........................................ 2001-269373

(51) Int. Cl.[7] ............................................. G01N 21/00
(52) U.S. Cl. .................................................. 356/73.1
(58) Field of Search .......................... 356/73.1, 479.44; 398/9–38; 385/134, 100, 33–38, 80, 85; 250/227.11, 227.28

(56) References Cited

U.S. PATENT DOCUMENTS 6,177,985 B1 * 1/2001 Bloom ....................... 356/73.1
6,459,478 B1 * 10/2002 Schmidt et al. ............ 356/73.1
6,590,642 B2 * 7/2003 Iida ........................... 356/73.1

FOREIGN PATENT DOCUMENTS

JP          A2000-193850          7/2000

* cited by examiner

Primary Examiner—Tu T. Nguyen
(74) Attorney, Agent, or Firm—Birch, Stewart, Kolasch & Birch, LLP

(57) ABSTRACT

A method is provided for measuring a far-end reflectance of a fiber-optic cable. The method comprises the steps of connecting an end face of the fiber-optic cable to a transceiver comprising a transmitter for transmitting an optical signal and a receiver for receiving an optical signal, transmitting an optical signal from the transmitter of the transceiver and receiving the optical signal reflected by the other end face of the fiber-optic cable, and measuring a first amount of light of the reflected optical signal, where the other end face of the fiber-optic cable is open to air, or where the other end face of the fiber-optic cable is made to contact a solid having the same or substantially the same refractive index as that of the fiber-optic cable, and measuring the far-end reflectance of the fiber-optic cable based on the first and second amounts of light.

20 Claims, 7 Drawing Sheets

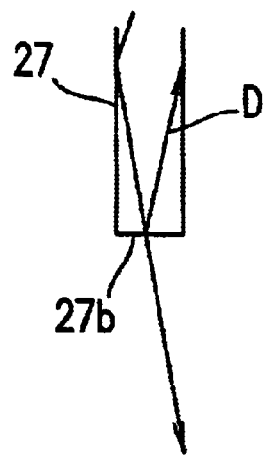 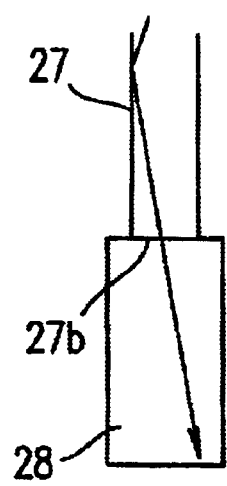 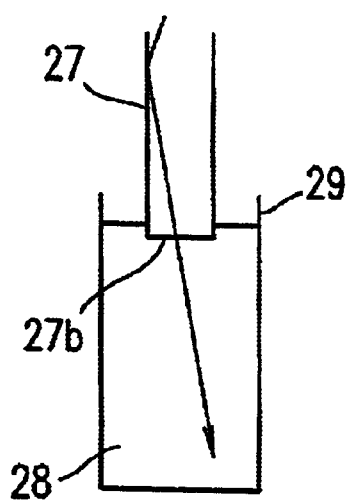
FIG. 2A  FIG. 2B  FIG. 2C
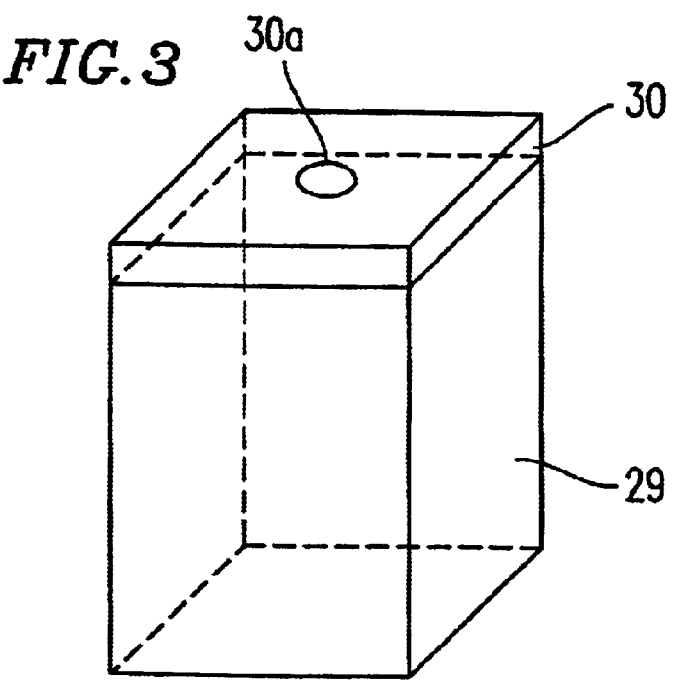
FIG. 3

METHOD FOR MEASURING FAR-END REFLECTANCE OF FIBER-OPTIC CABLE

BACKGROUND OF THE INVENTION

1. Field of the Invention

The present invention relates to an optical communications system for transmitting and receiving an optical signal bidirectionally through a single common fiber-optic cable. More particularly, the present invention relates to a method for measuring the far-end reflectance of a fiber-optic cable used in a digital communications system capable of high-speed transport, such as IEEE1394 and USB2.

2. Description of the Related Art

A conventional optical communications technique using a fiber-optic cable(s) will be described.

FIGS. 6A and 6B are schematic diagrams for explaining a one-directional communications method using a fiber-optic cable.

In the one-directional communications method shown in FIG. 6A, information is transported as an optical signal from a first transceiver 1 to a second transceiver 2 via a fiber-optic cable 3. A transmitter 1a of the first transceiver 1 and a receiver 2b of the second transceiver 2 are connected to the fiber-optic cable 3.

Conversely, when information is transported as an optical signal from the second transceiver 2 to the first transceiver 1 via a fiber-optic cable 3, as shown in FIG. 6B, a transmitter 2a of the second transceiver 2 and a receiver 1b of the first transceiver 1 are connected to the fiber-optic cable 3.

Note that when an optical signal is transported only from the first transceiver 1 to the second transceiver 2, the receiver 1b of the first transceiver 1 and the transmitter 2a of the second transceiver become unnecessary. Conversely, when an optical signal is transported only from the second transceiver 2 to the first transceiver 1, the receiver 2b of the second transceiver 2 and the transmitter 1a of the first transceiver 1 become unnecessary.

To achieve both optical signal transport from the first transceiver 1 to the second transceiver 2, and optical signal transport from the second transceiver 2 to the first transceiver 1, as shown in FIG. 6C, the transmitter 1a of the first transceiver 1 and the receiver 2b of the second transceiver 2 are connected to each other via a single fiber-optic cable 3 while the transmitter 2a of the second transceiver 2 and the receiver 1b of the first transceiver 1 are connected to each other via another single fiber-optic cable 4.

Therefore, in the conventional one-directional optical communications method, two fiber-optic cables are required for full-duplex communications in which an optical signal can be transmitted and received bidirectionally between a pair of transceivers.

Hereinafter, a full-duplex communications method capable of transmitting and receiving an optical signal through a single fiber-optic cable will be described.

FIG. 7A is a schematic diagram for explaining a method for transmitting and receiving an optical signal bidirectionally through a single fiber-optic cable.

In this conventional bidirectional communications method, a single fiber-optic cable 13 is connected to a first transceiver 11 and a second transceiver 12.

The transceivers 11 and 12 comprise connectors 11a and 12a, respectively. A plug (not shown) is provided at each of end faces 13a and 13b of the fiber-optic cable 13, and is connected to each of the connectors 11a and 12a of the respective transceivers 11 and 12.

FIG. 7B is a schematic diagram showing the connectors 11a and 12a of the respective transceivers 11 and 12 and the end faces 13a and 13b of the fiber-optic cable 13.

An optical signal is transmitted from the first transceiver 11 to the second transceiver 12 in the following manner. The optical signal is applied from the transmitter 11b of the transceiver 11 via the connector 11a to the end face 13a of the fiber-optic cable 13. This optical signal is introduced into the fiber-optic cable 13 and transmitted to the second transceiver 12. The optical signal is applied from the end face 13b of the fiber-optic cable 13 connected to the connector 12a of the second transceiver 12 to the receiver 12c of the second transceiver 12.

Similarly, when an optical signal is transmitted from the second transceiver 12 to the first transceiver 11, the optical signal transmitted via the fiber-optic cable 13 from the transmitter 12b of the second transceiver 12 is applied to the receiver 11c of the first transceiver 11.

In this case, for example, an optical signal emitted by the transmitter 11b of the first transceiver 11 is transmitted through the fiber-optic cable 13 to reach the receiver 12c of the second transceiver 12. In this case, however, part of the optical signal is reflected by the end faces 13a and 13b of the fiber-optic cable 13.

FIGS. 8A and 8B are schematic diagrams for explaining the reflection of an optical signal by the end faces 13a and 13b of the fiber-optic cable 13.

As shown in FIG. 8A, the end faces 13a and 13b of the fiber-optic cable 13 are connected to the connectors 11a and 12a of the first and second transceivers 11 and 12, respectively. When an optical signal is transmitted from the first transceiver 11 to the second transceiver 12, as indicated by arrows C shown in FIG. 8B, a part of an optical signal incidnet to the fiber-optic cable 13 is reflected by the end face 13a (near-end reflection), and as indicated by arrows D shown in FIG. 8B, a part of an optical signal outgoing from the fiber-optic cable 13 is reflected by the end face 13b (far-end reflection). The optical signals reflected by the near-end face 13a and the far-end face 13b of the fiber-optic cable 13 are transported along with the original optical signal which is transmitted from the transmitter 12b of the second transceiver 12 to the receiver 11c of the first transceiver 11. In this case, the reflected optical signal presents noise on the optical signal.

Therefore, it is important to measure how much an optical signal is reduced by the near- and far-end reflections.

A far-end reflectance representing a reduction in an optical signal due to far-end reflection is calculated, for example, in the following manner. An optical signal is emitted from the end face 13b of the fiber-optic cable 13 into air, allowing far-end reflection. The amount of light of the optical signal received by the receiver 12c is measured. On the other hand, the end face 13b of the fiber-optic cable 13 is immersed in a liquid matching oil having the same refractive index as that of the core of the fiber-optic cable 13 so that far-end reflection does not occur at the end face 13b of the fiber-optic cable 13. In this situation, the amount of light of an optical signal received by the receiver 12c is measured. The far-end reflectance is calculated based on the two measured amounts of light of optical signals.

A plug or the like is attached to an end of the fiber-optic cable 13, which is connected to a connector. When the end face 13b of the fiber-optic cable 13 is immersed in a liquid matching oil, the matching oil is likely to penetrate between the plug and a core of the fiber-optic cable 13. Therefore, when a number of fiber-optic cables 13 are measured for far-end reflectance, the matching oil has to be removed from the end face 13b of each fiber-optic cable 13, whereby the working efficiency is reduced.

SUMMARY OF THE INVENTION

According to an aspect of the present invention, a method for measuring a far-end reflectance of a fiber-optic cable, comprises the steps of connecting an end face of the fiber-optic cable to a transceiver comprising a transmitter for transmitting an optical signal and a receiver for receiving an optical signal, transmitting an optical signal from the transmitter of the transceiver and receiving the optical signal reflected by the other end face of the fiber-optic cable, and measuring a first amount of light of the reflected optical signal, where the other end face of the fiber-optic cable is open to air, transmitting an optical signal from the transmitter of the transceiver and receiving the optical signal reflected by the other end face of the fiber-optic cable, and measuring a second amount of light of the reflected optical signal, where the other end face of the fiber-optic cable is made to contact a solid having the same or substantially the same refractive index as that of the fiber-optic cable, and measuring the far-end reflectance of the fiber-optic cable based on the first and second amounts of light.

In one embodiment of this invention, when the solid has the same refractive index as that of the fiber-optic cable, the far-end reflectance of the fiber-optic cable is calculated as:

$$\text{Far-end reflectance} = \frac{P1 - P2}{A \times B + P1 - P2} \times 100 \ [\%] \quad (1)$$

where:
P1 is the first amount of light;
P2 is the second amount of light;
A is an output of light at the far-end face of the fiber-optic cable; and
B is a ratio of light received by the receiver.

In one embodiment of this invention, the solid is in the form of gel or an elastomer.

In one embodiment of this invention, the solid is contained in a container.

In one embodiment of this invention, the container comprises a lid having an opening. A tip portion including the other end face of the fiber-optic cable is inserted into the opening.

In one embodiment of this invention, a fixing member is provided in the opening provided in the lid, for fixing the tip portion of the fiber-optic cable to the opening.

In one embodiment of this invention, an inner side of the container is covered with an optical absorption material.

In one embodiment of this invention, when the solid has substantially the same refractive index as that of the fiber-optic cable, the far-end reflectance of the fiber-optic cable is calculated as:

$$\text{Far-end reflectance} = \frac{P1 - (P2 - A \times a)}{A \times B + P1 - (P2 - A \times a)} \times 100 \ [\%] \quad (2)$$

where:
P1 is the first amount of light;
P2 is the second amount of light;
A is an output of light at the far-end face of the fiber-optic cable;

B is a ratio of light received by the receiver; and
a is a surface reflectance of the solid with respect to the fiber-optic cable.

In one embodiment of this invention, the solid is in the form of a plate, and the other end face of the fiber-optic cable is made to contact the solid in a slanting direction with respect to the solid.

In one embodiment of this invention, the solid is covered with a material having light blocking and light absorbing capabilities.

Thus, the invention described herein makes possible the advantages of providing a method for easily measuring far-end reflection of a fiber-optic cable, in which measurement can be easily repeated without reducing characteristics of the fiber-optic cable, resulting in the excellent working efficiency.

These and other advantages of the present invention will become apparent to those skilled in the art upon reading and understanding the following detailed description with reference to the accompanying figures.

BRIEF DESCRIPTION OF THE DRAWINGS

FIGS. 2A to 2C are schematic diagrams for explaining an end face of a fiber-optic cable when the far-end reflectance of the fiber-optic cable is measured using the measurement method of the present invention.

FIG. 3 is a perspective view showing a container for containing a solid used in the measurement method of the present invention.

DESCRIPTION OF THE PREFERRED EMBODIMENTS

Hereinafter, the present invention will be described by way of illustrative examples with reference to the accompanying drawings.

Figure 1:
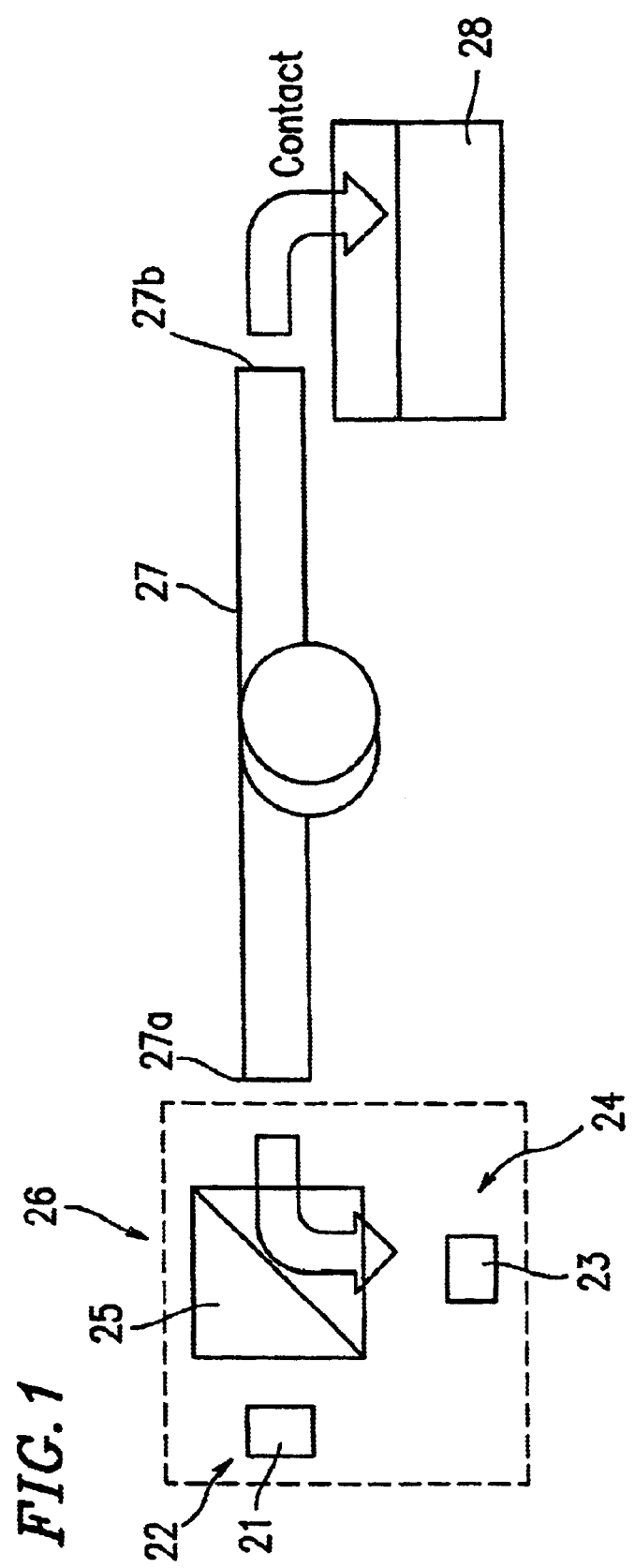
FIG. 1 is a schematic diagram for explaining a method for measuring the far-end reflectance of a fiber-optic cable according to the present invention.

FIG. 1 is a schematic diagram for explaining a method for measuring far-end reflectance of a fiber-optic cable according to an example of the present invention.

As shown in FIG. 1, an end face 27a of the fiber-optic cable 27 is connected to a transceiver 26. The transceiver 26 comprises a transmitter 22 having a light emitting element 21 for emitting an optical signal, a receiver 24 having a light receiving element 23 for receiving an optical signal, and a light splitting element 25 for transmitting an optical signal from the transmitter 22 into the fiber-optic cable 27 and for reflecting the optical signal from the fiber-optic cable 27 into the receiver 24.

Further, a solid 28 is prepared at the other end face 27b side of the fiber-optic cable 27, which has the same or substantially the same refractive index as that of a core of the fiber-optic cable 27. In this specification, "solid" is understood to include a substance which is not a liquid, i.e., the term "solid" includes a solid or gel substance, for example.

Firstly, a situation, as shown in FIG. 2A, is provided where the end face 27b of the fiber-optic cable 27, which is not connected to the transceiver 26, is open to air so that light is reflected at the far-end face 27b of the fiber-optic cable 27 as indicated by arrow D. Reflected light caused by far-end reflection and near-end reflection is measured by the transceiver 26.

Next, as shown in FIG. 2B, the far-end face 27b of the fiber-optic cable 27 is made to contact the solid 28 having the same or substantially the same refractive index as that of the core of the fiber-optic cable 27 so that no or substantially no difference in refractive index is present between the far-end face 27b of the fiber-optic cable 27 and the solid 28. In this situation, when an optical signal is transmitted from the transmitter 22 of the transceiver 26, the optical signal propagating through the fiber-optic cable 27 is not at all or substantially not reflected by the far-end face 27b of the fiber-optic cable 27 when entering the solid 28. Reflected light due to near-end reflection at the near-end face 27a of the fiber-optic cable 27 is measured by the receiver 24 of the transceiver 26.

Examples of a material for the solid 28 are shown in Table 1. The materials in Table 1 have the appropriate hardness and substantially the same refractive indexes (1.4 to 1.51) as that (1.49) of an acrylic fiber-optic cable 27. The surface reflectances of the materials with respect to the fiber-optic cable 27 is in the range of 0.001% to 0.0097%, which are substantially negligible.

TABLE 1

| Material | Refractive index | Surface reflectance to an acrylic optical fiber (refractive index: 1.49) |
| --- | --- | --- |
| Silicon gel | 1.4 | 0.0097% |
| Urethane rubber | 1.5 | 0.001% |
| Polyethylene gel | 1.51 | 0.0044% |

In this manner, the amount of reflected light at the far-end face 27b of the fiber-optic cable 27 is measured in the presence or absence of far-end reflection. The far-end reflectance of the far-end face 27b of the fiber-optic cable 27 is calculated based on the two amounts of reflected light.

When there is no difference in refractive index between the fiber-optic cable 27 and the solid 28, the far-end reflectance is calculated as:

$$\text{Far-end reflectance} = \frac{P1 - P2}{A \times B + P1 - P2} \times 100 \ [\%] \quad (1)$$

where:

P1 is the amount of light received by a light receiving element when the far-end face of a fiber-optic cable is open to air;

P2 is the amount of light received by the light receiving element when the far-end face of the fiber-optic cable is made to contact a solid;

A is the output of light at the far-end face of the fiber-optic cable; and

B is the ratio of received light.

Note that A and B in expression (1) are numerical values calculated as a result of other experiments as described below.

When there is a slight difference in refractive index between the fiber-optic cable 27 and the solid 28, the far-end reflectance is calculated as:

$$\text{Far-end reflectance} = \frac{P1 - (P2 - A \times a)}{A \times B + P1 - (P2 - A \times a)} \times 100 \ [\%] \quad (2)$$

where:

P1 is the amount of light received by a light receiving element when the far-end face of a fiber-optic cable is open to air;

P2 is the amount of light received by the light receiving element when the far-end face of the fiber-optic cable is made to contact a solid;

A is the output of light at the far-end face of the fiber-optic cable;

B is the ratio of received light; and a is the surface reflectance of the solid with respect to the fiber-optic cable.

Next, experimental examples in which the far-end reflectance of the end face 27b of the fiber-optic cable 27 was actually measured will be described.

The far-end face 27b of the fiber-optic cable 27 was open to air, an optical signal was transmitted from the transmitter 22 of the transceiver 26. In the light receiving element 23 (photodiode) of the receiver 24 in the transceiver 26, and a current flow of 0.217 $\mu$A was detected.

Thereafter, the far-end face 27b of the fiber-optic cable 27 was made to contact the solid 28 (gel) having the same refractive index as that of the fiber-optic cable 27. In this case, when an optical signal was transmitted from the transmitter 22 of the transceiver 26, a current flow of 0.04 $\mu$A was detected in the light receiving element 23 (photodiode) of the receiver 24 in the transceiver 26.

In this case, the light receiving element 23 (photodiode) had a conversion rate of 0.38 (A/W) at which a light signal is converted into a current. The above-described current values (A) were converted to an amount of light (W) using such a conversion rate. As a result, when the far-end face 27b of the fiber-optic cable 27 is open to air (0.217 $\mu$A), the amount of light was 0.217 ($\mu$A)/0.38 (A/W)=0.571 ($\mu$W). When the far-end face 27b of the fiber-optic cable 27 was made to contact the solid 28 (0.04 $\mu$A), the amount of light was 0.04 ($\mu$A)/0.38 (A/W)=0.105 ($\mu$W).

Therefore, the amount of light (i.e., P1–P2) which is equal to (0.571–0.105) ($\mu$W)=0.466 ($\mu$W) was detected as the amount of light reflected by the far-end face 27b of the fiber-optic cable 27, i.e., the amount of light entering the light receiving element 23 (photodiode).

Another experiment was conducted to obtain a ratio of the amount of light received by the light receiving element 23 of the receiver 24 in the transceiver 26 to the amount of light reflected by the far-end face 27b of the fiber-optic cable 27. Based on such a result (13.2%), the amount of light reflected by the far-end face 27b of the fiber-optic cable 27 is calculated to be 0.466 ($\mu$W)/0.132=3.53 ($\mu$W).

Further, a power meter was connected to the far-end face 27b of the fiber-optic cable 27 to measure the amount of light emitted from the far-end face 27b. As a result, the amount of light emitted from the far-end face 27b was 437.8 ($\mu$W).

The above-described measured values are substituted into expression (1) to calculate 3.53 ($\mu$W)/(437.8 ($\mu$W)+3.53 ($\mu$W))×100=0.00800, thereby obtaining the far-end reflectance of the far-end face 27b of the fiber-optic cable 27, i.e., 0.800%.

When the solid 28 has substantially the same refractive index as that of the fiber-optic cable 27, but there is a slight difference in refractive index, for example, the solid 28 was made of polyethylene gel (refractive index: 1.51), the end face of the fiber-optic cable 27 had a surface reflectance of 0.0044%.

By taking into consideration such an influence of the surface reflectance, the above-described measured values are substituted into expression (2). As a result, (0.466+437.8×0.000044)/(437.8×0.132+0.466+437.8×0.000044)×100=0.833. Thus, the far-end reflectance of the far-end face 27b of the fiber-optic cable 27 is calculated to be 0.833%, which is substantially equal to 0.800% which is obtained above using expression (1). As a result, even when the solid 28 has a refractive index slightly different from that of the fiber-optic cable 27, substantially the same value as obtained using expression (1) can be obtained.

As described above, the far-end face 27b of the fiber-optic cable 27 is made to contact the solid 28 having the same or substantially the same refractive index as that of the fiber-optic cable 27, and the far-end reflectance of the far-end face 27b of the fiber-optic cable 27 is measured. Therefore, there does not occur the problem that a liquid substance is attached to a plug or the like provided at the far-end face 27b of the fiber-optic cable 27. As such, a number of fiber-optic cables 27 can be easily and repeatedly measured.

The solid 28 to be made so as to contact the far-end face 27b of the fiber-optic cable 27 may be made of a solid or gel substance. When the solid 28 is made of a gel substance, the gel solid 28 is used while being contained in a container 29 as shown in FIG. 2C.

The solid 28 may be made of an elastomer, such as naturally-occurring or synthetic rubber.

Further, as to the solid 28, a lid 30 having a hole 30a for inserting the far-end face 27b of the fiber-optic cable 27 may be attached to a top of a container 29 holding the solid 28 as shown in FIG. 3.

When such a lid 30 is provided on the container 29 containing the solid 28, dust and dirt which may be responsible for reflection of an optical signal can be prevented from being attached to the solid 28. Further, when the hole 30a for inserting the far-end face 27b of the fiber-optic cable 27 is provided in the lid 30, the end face 27b of the fiber-optic cable 27 is only pushed into the hole 30a of the lid 30, whereby ambient light can be prevented from entering the container 29. Therefore, the far-end reflectance of the fiber-optic cable 27 can be measured with high precision.

Figure 4A:
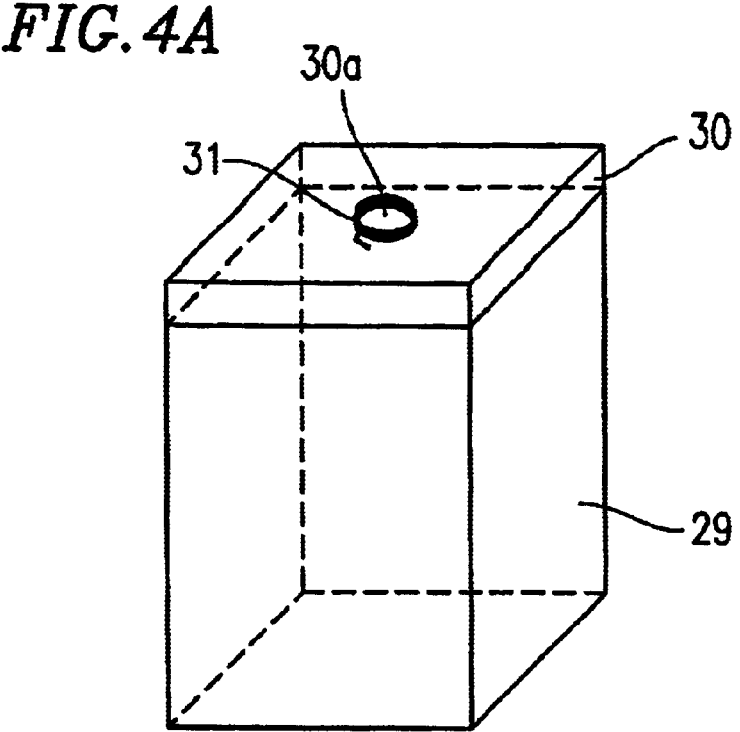
FIGS. 4A and 4B are perspective views showing a container for containing a solid used in the measurement method of the present invention, in which a fixing jig is provided in a hole for inserting an end face of a fiber-optic cable.
Figure 4B:
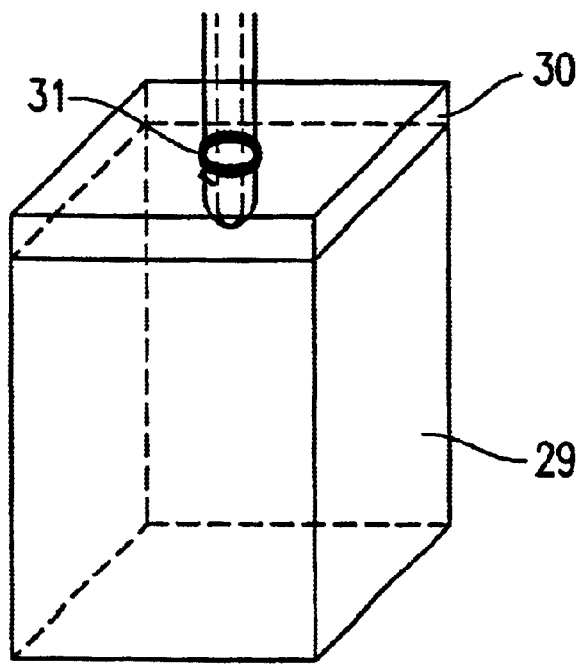

Further, as shown in FIG. 4A, when a fixing jig 31 for fixing the far-end face 27b of the fiber-optic cable 27 to the hole 30a of the lid 30 attached to the container 29 is provided, as shown in FIG. 4B, the far-end face 27b of the fiber-optic cable 27 can be maintained to be pressed to the solid 28 in the container 29, whereby the end face 27b of the fiber-optic cable 27 need not be pressed to the solid 28 in the container 29 by hand (i.e., manually) during measurement of the far-end reflectance, whereby the measurement of the far-end reflectance is made easier and more accurate.

Further, when the container 29 containing the solid 28 is covered with an optical absorption material, light propagating through the container 29 can be absorbed by the optical absorption material, whereby the far-end reflectance can be measured with higher precision.

Figure 5:
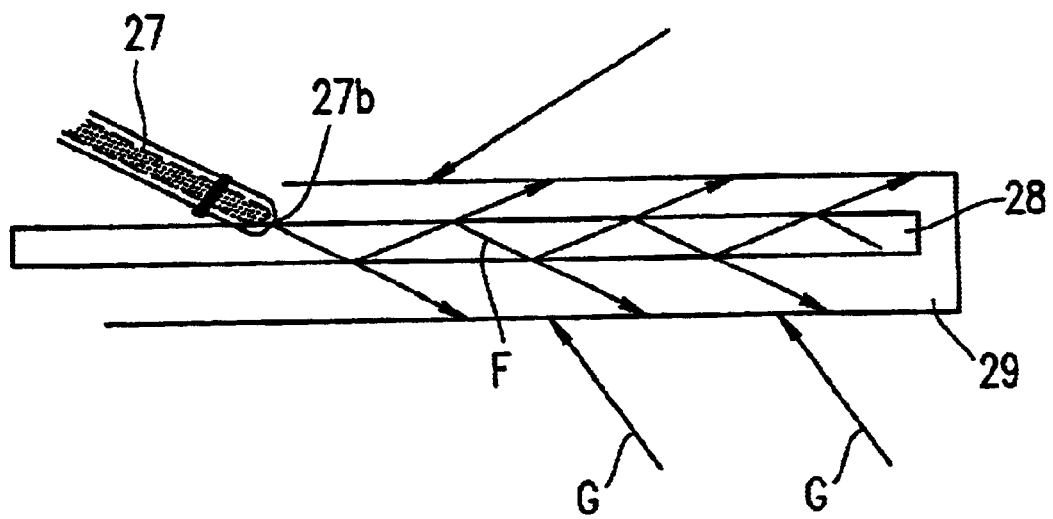
FIG. 5 is a side view showing a solid in the shape of a plate used in the measurement method of the present invention.
Figure 6A:
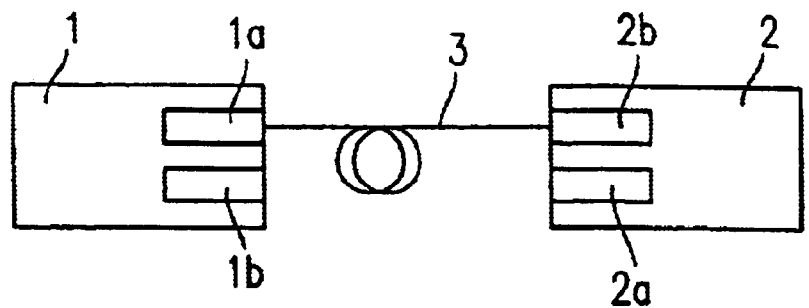
FIGS. 6A to 6C are schematic diagrams for explaining a one-directional optical communications technique using a fiber-optic cable(s).
Figure 6B:
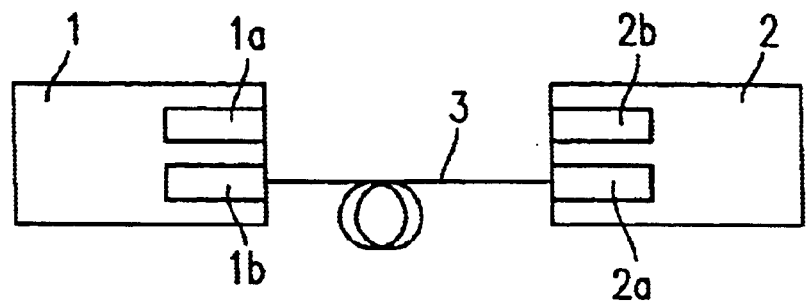
Figure 6C:
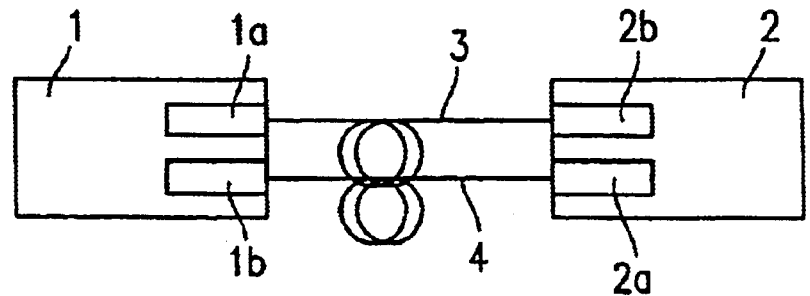
Figure 7A:
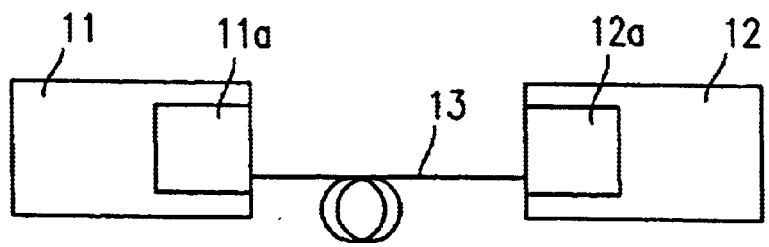
FIGS. 7A and 7B are schematic diagrams for explaining a bidirectional optical communications technique using a fiber-optic cable.
Figure 7B:
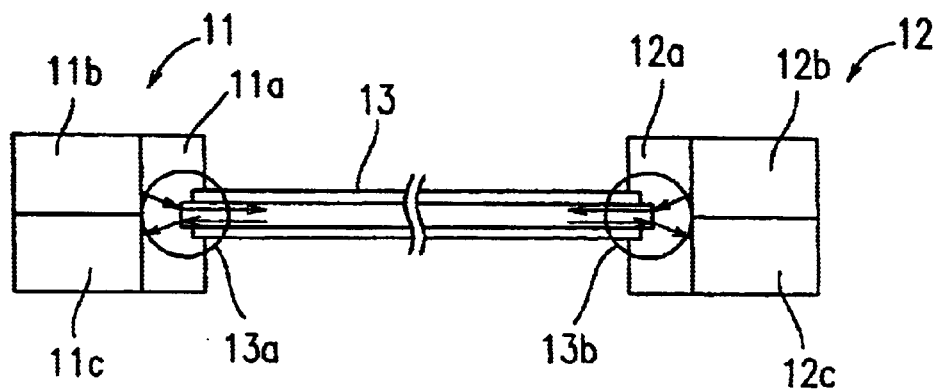
Figure 8A:
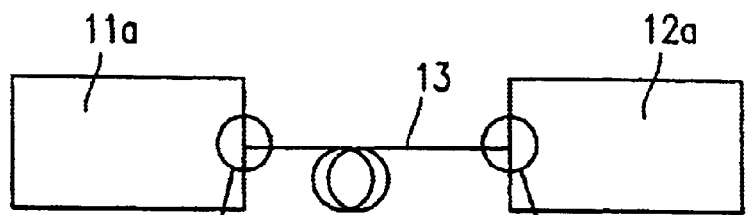
FIGS. 8A and 8B are schematic diagrams for explaining a tip portion of a fiber-optic cable and a connection portion of a transceiver in a bidirectional optical communications technique using a fiber-optic cable.
Figure 8B:
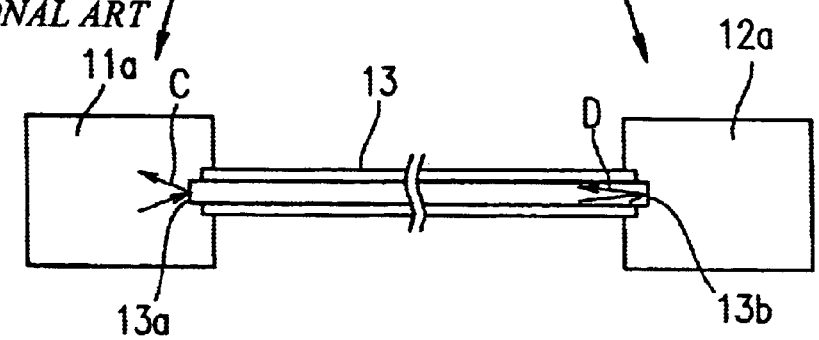

Furthermore, the solid 28 may be in the shape of a plate, as shown in FIG. 5 so that light emitted from the far-end face 27b of the fiber-optic cable 27 enters the solid 28 in a slanting (oblique) direction. In this case, as indicated by arrow F, the light entering the solid 28 is diffused away from the far-end face 27b of the fiber-optic cable 27. Therefore, even when the volume of the solid 28 is reduced, light transmitted in the solid 28 can be prevented from being brought back into the fiber-optic cable 27.

Further still, the plate-shaped solid 28 may be covered with an optical absorption material 29. In this case, when the far-end reflectance is measured, as indicated by arrows G in FIG. 5, ambient light, such as light of a fluorescent lamp, can be prevented from entering the solid 28, and light propagating through the solid 28 can be absorbed.

As described above, according to the present invention, the far-end reflectance of an end face of a fiber-optic cable is measured by causing the tip portion of the fiber-optic cable to come into contact with a solid having the same or substantially the same refractive index as that of the fiber-optic cable, whereby the far-end reflectance can be measured with high precision. Further, it is possible to avoid the problem that a liquid substance is attached to the end face of the fiber-optic cable, whereby a process of removing the liquid substance from the end face of the fiber-optic cable, and a number of fiber-optic cables can be easily measured for the far-end reflectance.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for measuring a far-end reflectance of a fiber-optic cable, comprising the steps of:

connecting an end face of the fiber-optic cable to a transceiver comprising a transmitter for transmitting an optical signal and a receiver for receiving an optical signal;

transmitting an optical signal from the transmitter of the transceiver and receiving the optical signal reflected by the other end face of the fiber-optic cable, and measuring a first amount of light of the reflected optical signal, wherein the other end face of the fiber-optic cable is open to air;

transmitting an optical signal from the transmitter of the transceiver and receiving the optical signal reflected by the other end face of the fiber-optic cable, and measuring a second amount of light of the reflected optical signal, wherein the other end face of the fiber-optic cable is made to contact a solid having the same or substantially the same refractive index as that of the fiber-optic cable; and measuring the far-end reflectance of the fiber-optic cable based on the first and second amounts of light.

2. A method according to claim 1, wherein when the solid has the same refractive index as that of the fiber-optic cable, the far-end reflectance of the fiber-optic cable is calculated as:

$$\text{Far-end reflectance} = \frac{P1 - P2}{A \times B + P1 - P2} \times 100 \; [\%] \quad (1)$$

where:

P1 is the first amount of light;

P2 is the second amount of light;

A is an output of light at the far-end face of the fiber-optic cable; and

B is a ratio of light received by the receiver.

3. A method according to claim 2, wherein the solid is in the form of gel or an elastomer.

4. A method according to claim 3, wherein the solid is contained in a container.

5. A method according to claim 4, wherein the container comprises a lid having an opening, wherein a tip portion including the other end face of the fiber-optic cable is inserted into the opening.

6. A method according to claim 5, wherein a fixing member is provided in the opening provided in the lid, for fixing the tip portion of the fiber-optic cable to the opening.

7. A method according to claim 4, wherein an inner side of the container is covered with an optical absorption material.

8. A method according to claim 1, wherein when the solid has substantially the same refractive index as that of the fiber-optic cable, the far-end reflectance of the fiber-optic cable is calculated as:

$$\text{Far-end reflectance} = \frac{P1 - (P2 - A \times a)}{A \times B + P1 - (P2 - A \times a)} \times 100 \ [\%] \quad (2)$$

where:

P1 is the first amount of light;

P2 is the second amount of light;

A is an output of light at the far-end face of the fiber-optic cable;

B is a ratio of light received by the receiver; and a is a surface reflectance of the solid with respect to the fiber-optic cable.

9. A method according to claim 8, wherein the solid is in the form of gel or an elastomer.

10. A method according to claim 9, wherein the solid is contained in a container.

11. A method according to claim 10, wherein the container comprises a lid having an opening, wherein a tip portion including the other end face of the fiber-optic cable is inserted into the opening.

12. A method according to claim 11, wherein a fixing member is provided in the opening provided in the lid, for fixing the tip portion of the fiber-optic cable to the opening.

13. A method according to claim 10, wherein an inner side of the container is covered with an optical absorption material.

14. A method according to claim 1, wherein the solid is in the form of gel or an elastomer.

15. A method according to claim 14, wherein the solid is contained in a container.

16. A method according to claim 15, wherein the container comprises a lid having an opening, wherein a tip portion including the other end face of the fiber-optic cable is inserted into the opening.

17. A method according to claim 16, wherein a fixing member is provided in the opening provided in the lid, for fixing the tip portion of the fiber-optic cable to the opening.

18. A method according to claim 15, wherein an inner side of the container is covered with an optical absorption material.

19. A method according to claim 1, wherein the solid is in the form of a plate, and the other end face of the fiber-optic cable is made to contact the solid in a slanting direction with respect to the solid.

20. A method according to claim 19, wherein the solid is covered with a material having light blocking and light absorbing capabilities.

* * * * *